3,272,778
PROCESS FOR POLYMERIZING ALDEHYDES
Shinichi Ishida, Tokyo, Japan, assignor to Asahi Kasei Kogyo Kabushiki Kaisha, Osaka, Japan, a corporation of Japan
No Drawing. Filed Apr. 18, 1961, Ser. No. 103,730
Claims priority, application Japan, Nov. 2, 1960, 35/44,091; Nov. 10, 1960, 35/44,352, 35/44,353
3 Claims. (Cl. 260—67)

This invention relates to novel polymerization process of aldehydes, particularly aliphatic aldehyde.

Polymerization of acetaldehyde and some higher aldehydes have been reported by M. Letort and M. W. Travers, and recently it has been discovered by J. Furukawa and others that the polymerization occurs over alumina (Makromol Chem., 33 (1959), 32).

This polymerization is due to a polyaddition reaction through the cleavage of the aldehyde group resulting in the product of polyether structure. Generally, three types of isomeric structure can be expected in stereostructure of this product, and polyaldehydes which have heretofore been known are amorphous material having irregular structure which is considered to be one of these types. All of these polyaldehydes are soft and waxy, therefore, unsuitable for molding material. The object of present invention is to produce crystalline polymer having regular structure which are different from such known polymer, and are advantageous from an industrial point of view. According to the present invention a process for polymerizing aldehydes comprises polymerizing a monoaldehyde containing from 2 to 10 carbon atoms in the molecule and having the general formula RCHO, wherein R is a member selected from the group consisting of alkyl, cycloalkyl, alkenyl, cycloalkenyl, haloalkenyl, halogen-substituted cycloalkenyl and 5- and 6-membered heterocyclic radicals containing oxygen in the ring, with a catalyst selected from the group consisting of a hydride of a metal of Group II and an organometallic compound of a metal of Group II of the Periodic Table in the presence of a solvent medium and at a temperature of $-120°$ to $30°$ C. The highest yields of polymer are obtained when the aldehyde and catalyst are premixed at a temperature below room temperature but above the temperature at which polymerization commences, so that polymerization is not initiated at this stage. The solvent medium may be a solvent or a nonsolvent for the polymer product, in the former case a clear solution of polymer is obtained and in the latter a suspension thereof.

The preferred aldehydes for use in the process of the invention are those in which the radical R in the aforementioned general formula is a saturated aliphatic radical and especially those aldehydes containing from 2 to 7 carbon atoms in the molecule.

Amorphous polyaldehyde heretofore known is rubberlike or elastomeric material and thermally unstable, whereby depolymerization occurs gradually even when left in the air, hence it is not fit for treatment and processing, and can not be utilized as actual molding material. The polymers in accordance with the present invention are non-adhesive, normally solid and plastic, highly crystalline materials. The time-elapsing and thermal stability is remarkably improved. The material is tolerant to processing and therefore is acceptable material for producing molded articles such as film, fiber, pipe rod, etc.

This invention relates to a process for producing polyaldehyde having polyether structure, by polymerizing alkyl-, cycloalkyl-, arylalkyl-, alkyl halide-, cycloalkyl halide-, heterocyclic aldehydes having 2 to 10 carbon atoms in the molecule employing organic compounds of metals of Group II of the Periodic Table in the presence of solvent at a temperature of $-30°$ C. to $-120°$ C.

The present invention is more effective when the contact or mixing of catalyst and aldehyde is conducted at or below room temperature which does not initiate the polymerization of aldehyde, and thereafter raising the temperature to the polymerization temperature. Particular effect and advantage can be obtained through two modes; one is a process for producing suspension polymerization product employing inert solvent which does not dissolve resultant polyaldehyde; and the other is a process for producing uniform clear polymer solution employing solvent which dissolves resultant polyaldehyde. The aldehyde polymerized in accordance with the present invention is aliphatic aldehyde having the general formula RCHO, R being alkyl, cycloalkyl, alkenyl, aldoalkenyl, etc., halogen-substituted derivatives thereof, or a 5- to 6-membered, oxygen-containing heterocyclic group.

Preferably, the aldehydes are saturated aliphatic aldehydes having 2 to 10 carbon atoms, more preferably those having 2 to 7 carbon atoms.

The typical aldehydes which can be polymerized in accordance with present invention are acetaldehyde, propionaldehyde, n-butyraldehyde, isobutyraldehyde, valeraldehyde, isovaleraldehyde, hexanal, 2-ethyl hexanal, heptanal, octanal, nonal, decanal, monochloracetaldehyde, dichloracetaldehyde, trichloracetaldehyde, monofluoracetaldehyde, difluoracetaldehyde, trifluoracetaldehyde, monochlorpropionaldehydes, $(\alpha,\beta)$, dichlorpropionaldehydes $(\alpha\alpha,\beta\beta,\alpha\beta)$, trichlorpropionaldehydes, cyclohexylaldehyde, cyclohexyl acetaldehyde, furfural, 3-cyclohexenecarboxaldehyde, 2-formyl 3.4-dihydro 2H-pyran etc. These compounds are employed solely or as a mixture of more than two compounds.

Three preferred classes of catalyst which may be employed according to the invention are represented by the formulae $MH_2$ and $MR'_2$ and $MR'X$, wherein M is a metal of Group II as, for example, beryllium, magnesium, calcium, strontium, barium, radium, zinc, cadmium and mercury; R' is alkyl, cycloalkyl, aryl, alkenyl, cycloalkenyl, alkoxy, cycloalkoxy, aryloxy groups containing 1 to 10 carbon atoms, said group substituted by one or more halogen atoms and X is hydrogen, halogen, hydroxy, primary or secondary organic amines.

The examples of these compounds are hydride of the above metals, metal alkyls such as diethylberyllium, diethyl-magnesium, diethylzinc, diethylcadmium, diethylmercury, diethylcalcium, tetraethylzinc-calcium, mixed metalalkyls thereof, metal aryls such as diphenylzinc, diphenylmercury, diphenylberyllium, diphenylcalcium, diphenylmagnesium, metal cycloalkyls such as dicyclohexyl mercury, dicyclohexylzinc, Grignard type organometallic compounds wherein X is halogen such as various magnesium Grignard reagents, namely alkylmagnesium chloride, phenylmagnesium bromide, alkylzinc iodide, phenylmagnesium bromide, alkylzinc iodide, arylzincchloride, alkylcadmium chloride, methylberyllium iodide, aryl mercury chloride etc., alkoxide such as conventional metal-alkoxide namely methoxide, ethoxide, isopropoxide, and alkyl metal alkoxide such as methylzinc methoxide, n-butylzinc methoxide, isopropyl beryllium methoxide, ethyl-magnesium ethoxide, ethylcalcium ethoxide, ethylcadmium ethoxide, ethylmercury ethoxide, arylmetal aryloxide, cycloalkyl metal, cycloalkoxide, alkyl metal hydrides, aryl metal hydrides such as ethylberyllium hydride, ethylzinc hydride, phenyl magnesium hydride.

The amount of organo metal compound required in the present invention is within the range of about 0.01–10 mol percent, preferably about 0.1–3 mol percent. The amount of less than 0.01% by weight based on reaction mixture is not sufficient to initiate polymerization reaction desirably, and the amount of catalyst of more than 3 mol percent is not employed normally for the reasons that maximum polymerization rate is obtained at certain concentration, and polymerization rate is saturated even if excessive amount of catalyst is employed. And in addition the residual catalyst in polymer accelerates to make polymer, inferior. However, in general, the amount varies depending upon the purity of monomer, solvents, diluents. More catalyst is required when there is destruction of catalyst due to reactive impurities contained therein as when the purity of solvents and monomer employed is low. It is desirable to employ small amounts of carbonic acid gas, oxygen, moisture, alcohol in order to decrease the consumption of catalyst. The present invention can be conducted without employing solvents and diluents, however, it is desirable to conduct polymerization in the presence of these solvent and diluent to produce superior polymer.

The solvents employed in the present invention can be any substance so far as the activity of catalyst is not damaged. However, liquid organic compounds or mixtures which are liquid within the range of polymerization temperature namely −30° C. to −120° C.

Generally solvents may be alkanes, such as propane, butane, pentane, hexane, heptane, octane, cyclic alkanes such as cyclopentane, cyclohexane, methylcyclohexane, tetraline, decaline etc. alkenes such as propene, butene, aryls such as benzene, toluene, xylenes, ethers such as dialkyl, aryl, cycloalkyl ether, cyclic ether, mixed ethers thereof namely dimethylether, diethylether, dipropylether, dichloroethylether, ethyleneglycol dimethylether, dioxane, anisol, halogenated hydrocarbons, halogenated ethers as more characteristic solvents, namely methylchloride, methylenedichloride, chloroform, carbontetrachloride, ethylenedichlorides, monochlorethylene, dichloroethylene, trichlorethylene, and esters such as ethylacetate, ethylbutyrate, diethylcarbonate etc. nitriles such as acetonitrile, propyonitrile.

The polymerization of present invention is conducted at low temperature. Normally, the temperature is from below 0° C. up to the point where aldehyde to be polymerized solidifies, preferably −30° C. to −120° C. and the range of −20° C. to −80° C. is employed from economical point of view. It is interesting that the rate of polymerization reaction has negative temperature coefficient, and the lower the temperature, the greater is the rate of polymerization and the content of crystalline polymer in raw polymer. Upper limit of polymerizable temperature is defined. The upper limit varies slightly depending upon the variety of catalyst employed, solvent and aldehydes, and in case of acetaldehyde, the temperature is about −40° C. Accordingly, it is desirable to polymerize at possible lower temperature. Normally, reaction is conducted under autogeneous pressure, and the pressure of several hundred kilograms per square centimeters.

The manner of addition of catalyst which is the greatest feature of present invention will be explained. Organometallic compounds employed as catalyst of instant invention such as stated above are generally considered to react with aldehyde, and serve as a catalyst or reactant for low molecule reaction other than polymerization reaction. Namely, organometallic compounds reacted with aldehyde are considered to form Meerwein-Ponndorf type or Grignard type complex and convert into alcohol or ketone, with the result that organometallic compound itself is stabilized due to the above complex formation, and loose active property originally possessed. Hence, we have initially conducted catalyst addition through the process in which these organometallic compounds used as catalyst is contacted with aldehyde at low temperature. However, as a result of further investigation, it has been found that the truly effective catalysts are not organometallic compounds themselves but intermediate complexes produced by reacting these organometallic compounds with aldehyde as monomer. It has been found that such a complex tends to be produced at about room temperature rather than at a lower temperature such as −78° C., furthermore, this intermediate complex does not initiate polymerization at normal temperature or above certain temperature which is below normal temperature, and no low molecule chemical reaction such as reduction, oxidation proceeds in this polymerization system at below certain temperature.

For example, in case of acetaldehyde and zinc diethyl, reaction occurs immediately at about normal temperature, generating ethylene, and forming complex compounds, however, polymerization activity is still retained when left for as long two days in the presence of nitrogen. Similar effect can be observed in case of other organometallic compounds, and essentially same result is obtained when other aldehyde is involved although slight difference exists.

On the basis of the above discovery, it is not necessary to conduct the addition of catalyst to aldehyde or the addition of aldehyde over catalyst and introduction at low polymerization temperature, and it is possible to conduct the addition at room temperature or at a temperature above polymerization initiating temperature and below room temperature. Industrially, not only the mixing prior to polymerization can be conducted at about room temperature (from −5° C. to +30° C.) but storing of polymerization mixture is possible, therefore, weighing and analysis are easy, and various advantages, storage as stock solution and possibility of continual polymerization such as transportation through pipeline or continual supply to polymerization bath. Moreover, the crystallinity of polyaldehyde to be produced remarkably varies depends on the polymerization process, however, generally, as disclosed my pending Japanese patent application No. 22,104/60, crystallinity can be increased when hydrocarbons are employed as solvent, and this is more remarkable by adding catalyst at room temperature.

According to the present invention, not only high crystalline polyether can be produced in higher yield, thereby resulting in various advantage in handling, but the quality can also be improved.

For instance, percent of methanol extracted fraction based on total polymer can be adopted as measure of crystallinity since amorphous polyacetaldehyde dissolves in methanol. The percent of methanol extractable fraction based on total polymer when employing zinc diethyl without solvent is about 50% while about 30% results when employing N-hexane as solvent and zinc diethyl is added to the monomer at −78° C.

In contrast to the above, almost no extraction can be obtained, or only 10% is resulted, and yield of polymerization is several times increased within short period of time when polymerization is conducted at −78° C. by adding catalyst at 20° C. in accordance with the process of instant invention.

This fact relates to the phenomena that effective catalyst is dispersed into reaction mixture, particularly into monomer in relatively uniform condition. For example, when N-hexane is employed as solvent, it is separated from acetaldehyde at low temperature resulting in two layers, and does not produce any uniform solution, however, homogeneous solution in any proportion covering considerably board range is prepared at room temperature. Hence, if catalyst is added to such as homogeneous solution to produce truly effective catalyst complex, favourable result as stated above can be obtained through cooling and polymerization because the resultant complex is homogeneously dispersed.

When the catalyst is added at about room temperature, the rate of polymerization is remarkably increased as compared with the case in which catalyst is added at lower temperature. It is believed that this is due to the fact that truly effective catalyst is produced quickly and is uniformly dispersed into monomeric aldehyde as stated before. That is, when polymerization of acetaldehyde is conducted with diethyl zinc, if the addition is effected at −78° C., it takes about 24 hours to reach to saturated polymerization rate, however, if added at 20° C., rapid polymerization is commenced simultaneously with cooling, and reaches saturated polymerization rate within ½ hour to 1 hour, and the value of saturated polymerization rate is greater than is the case wherein the addition is at lower temperature, thereby resulting in desirable crystallinity of polymer produced and stability.

The peculiar difference between the addition of catalyst at lower temperature and room temperature is the relation of the concentration of catalyst and the rate of polymerization. Namely, in case of addition at lower temperature, the rate of polymerization after certain period of time is simply increased in accordance with increasing concentration of catalyst, and the rate of polymerization reaches saturated value in about 2 mole percent, thereby low rate of polymerization results. However, when added at about room temperature, maximum value results in the neighbourhood of certain concentration without regard to the variety of solvent, and this maximum rate of polymerization is larger (90%–95%) which can never be obtained through low temperature addition process, and the rate decreases after this maximum value, then saturated at specific rate of polymerization.

The range of the concentration of catalyst which results in this maximum value is narrow, and about 2%–3% (weight) based on monomer, however, this value is slightly affected by the purity of solvent, monomer, etc.

If large yield of polymerization is desirable, it is effective to conduct the polymerization in the neighbourhood of such a concentration. One of the characteristic examples of the solvent employed is halogenated alkyls. For instance, methylene chloride is employed. Acetaldehyde is missible with methylene chloride in any proportion at low temperature. When polymerization is conducted with zinc diethyl in homogeneous solution as catalyst, uniform solution is obtained, film, filament, etc., are produced by evaporation. This polyacetaldehyde is stable crystalline polymer.

Crystallinity may slightly vary depending upon the condition of polymerization, in some case, it may exist as stereoblock polymer. Contrary to the difficulty encountered in the preparation of film and filament, produced from polyacetaldehyde produced by the employment of n-hexane, as solvent; the above process provides an easy method for producing film and filament. Unless polymer is high polymerized, such halogenated alkanes has solubilizing capacity for crystalline polyacetaldehyde.

Hence, crystalline polymer can be obtained in the form of homogeneous solution, continual solution polymerization is possible, therefore, it is advantageous that polymer is produced in continual manner and the resultant polymer is directly processed into molded article, such as film, filament in accordance with this process without passing through the steps such as separation of polymer, drying, pulverizing and dissolving which are required in batch type process.

Toluene, xylene, dichlorethyl ether, etc., rather than chlorinated alkanes such as chloroform, methylene chloride, carbon tetrachloride, etc., previously mentioned for these solvents can be added.

Copolyether can be obtained through polymerization of the mixture of more than two aldehydes in accordance with the process similar to the above mentioned. This process is effective for the modification of various physical properties, and enable one to achieve a desired characteristic property in polyether by the employment of halogenated aliphatic aldehydes.

The invention will be explained in more detail in the following examples, but it should be understood that various modification is possible without altering the subject of this invention and not to limit the invention.

*Example 1*

10 parts by weight of acetaldehyde prepared by treating paraldehyde which is dried over molecular sieve with calcium carbonate to remove acidic material, adding small amount of paratoluene sulfonic acid, then heating for decomposition and 20 parts (hereinafter referred to as parts by weight) prepared by sufficient dehydration, drying and purification are charged into vessel replaced with nitrogen, cooled to −78° C., 0.5 part of diethyl zinc is added. After agitating and closely corked, left for 24 hours.

Then, cork is removed, 0.50 part of N-hexane is added and agitated. Solid material is separated in nitrogen atmosphere and thoroughly washed. After vacuum drying, 4.3 parts of white solid is obtained. 20 parts of methanol is employed to extract at 20° C., and the decrease due to extraction is 35%. The solid after extraction has higher crystallinity according to X-ray and the distance between surfaces are found to be 7.3 A. (s), 52 A. (m), 3.9 A. (s), 3.29 A. (m), 2.88 A. (m), 2.54 A. (vw), 2.33 A. (w), 2.16 A. (vw) and 2.04 A. (w).

As a result of infrared spectra, this is found to be polyether type polyacetaldehyde.

*Example 2*

10 parts of acetaldehyde prepared as in Example 1 and 20 parts of N-hexane which was similarly purified and dried are mixed together at room temperature in the vessel replaced with nitrogen, and 0.2 part of zinc diethyl is added and agitated. Then cooled to −78° C., after 5 minutes and left for 2 hours. Resultant precipitate is similarly filtered out, washed with N-hexane and dried in vacuum. 3.7 parts of white solid polyacetaldehyde is obtained. Methanol extraction is about 6% and no methanol soluble fraction in polymer is found in similar experiment.

As a result of X-ray and infrared analysis, polymer is found to be crystalline polyether type polyacetaledhyde which is similar to the one in Example 1.

*Example 3*

10 parts of thoroughly dried trichloracetaldehyde and 20 parts of hephane are mixed together in the vessel replaced with nitrogen, and after adding 0.2 parts of ethylmagnesium chloride, left in the bath at −80° C. for 2 hours. Precipitate is separated out, and thoroughly washed with heptane ether, thereafter dried in vacuum and 6.5 parts of polytrichloracetaldehyde containing crystalline part.

*Example 4*

20 parts of diethyl ether and 0.2 part of tetraethyl zinc-calcium are charged into the vessel replaced with nitrogen at 30° C., and 10 parts of propionaldehyde is added, then cooled to −78° C. After leaving for 20 hours, product is separated out and 3 parts of polypropionaldehyde containing crystalline part.

*Example 5*

20 parts of N-hexane and 0.2 part of diethyl magnesium are charged into the vessel replaced with nitrogen at room temperature, and 10 patrs of acetaldehyde is added while being agitated.

After leaving for 2 hours in the bath at −100° C., 3.2 parts of polyacetaldehyde containing crystalline part is obtained from resultant precipitate.

*Example 6*

After charging the mixture of 20 parts of diethyl ether, 0.2 part of partly alkoxidized ethyl zinc prepared by adding ethyl alcohol to zinc diethyl in equilibrium with one ethyl group of zinc diethyl and 10 parts of acetaldehyde into the vessel replaced with nitrogen, and cooled to −78° C. 3.3 parts of polyacetaldehyde containing crystalline part is obtained after leaving for 24 hours.

*Examples 7–16*

Polymers are produced from the composition indicated in the following table through almost same operation as stated in Examples 2–6. The polymers in each polymerization system are found to be crystalline polyether type acetaldehyde as a result of X-ray and infrared analysis.

| No. | Aldehyde as monomer (parts) | Solvent (parts) | Catalyst(parts) | Polymer (parts) |
|---|---|---|---|---|
| 7 | Acetaldehyde (10) | Propylene (20) | Zinc diethyl (0.2) | 3.2 |
| 8 | ——do—— | Diethylether (20) | ——do—— | 3.7 |
| 9 | ——do—— | ——do—— | Zinc ethoxide (0.2) | 2.5 |
| 10 | Propionaldehyde (10) | N-hexane (20) | Zinc diethyl (0.5) | 3.2 |
| 11 | α,β-dichlorpropionaldehyde (10) | ——do—— | ——do—— | 2.1 |
| 12 | Heptanal (10) | ——do—— | ——do—— | 1.5 |
| 13 | Isobutyraldehyde (10) | ——do—— | ——do—— | 2.7 |
| 14 | Acetaldehyde (10) | Acetonitrile (20) | ——do—— | 0.8 |
| 15 | ——do—— | Diethyl carbonate (20) | ——do—— | 2.7 |
| 16 | ——do—— | Ethylacetate (20) | ——do—— | 3.3 |

*Example 17*

30 cc. of toluene and 15 grams of acetaldehyde are charged into the vessel replaced with nitrogen. After mixing and agitating, 0.35 gram of diethyl zinc is added, and after 10 minutes, cooled to −78° C., then, left for 2 hours. The system is turned into colourless clear homogeneous viscous solution.

The solution is poured into dry N-hexane, and resultant precipitate is collected and washed with methanol, thereby, 4.5 grams of solid white crystalline polyacetaldehyde is resulted.

*Example 18*

20 cc. of dry N-hexane and 10 grams of tetrahydro furfurylaldehyde are charged into the vessel replaced with nitrogen, and 0.5 gram of diethyl zinc is added. After 5 minutes, cooled to −78° C. and left for 10 hours.

Precipitate is collected, washed and dried in vacuum, thereby 2.2 grams of white solid polymer is obtained.

*Example 19*

50 cc. of thoroughly purified and dried methylene chloride and 10 grams of acetaldehyde are charged into the vessel replaced with nitrogen. 0.5 gram of diethyl zinc is added at room temperature and cooled to −78° C. after corking. After 2 hours, the polymerization system is turned into viscous uniform solution, and thread-like polymer is obtained when poured into N-hexane. Thoroughly washed and dried to obtain 1.7 grams of polyacetaldehyde containing crystalline part. In this example, when the solution is not poured into N-hexane, but spread on the glass plate and remaining monomer and solvent are removed, semi-transparent film or plate is obtained.

*Example 20*

50 cc. of purified and dried methylene chloride and 10 grams of trichloracetaldehyde are charged into vessel replaced with nitrogen, and 0.5 gram of diethyl zinc is added. After corking, left at −78° C. for 2 hours. Polymerization is almost completed within 1 hour, and cork is removed after 2 hours. The contents are spread on heated glass plate to obtain thin plate. The polymer is crystalline and the yield is 2.2 grams.

*Example 21*

0.5 part of fully dried zinc ethoxide is charged into the vessel replaced with nitrogen, and 10 parts of acetaldehyde is added. 20 parts of diethyl ether is added after 2 hours and put into the bath at −78° C. for 20 hours. The produce is separated and washed, then dried to obtain 2.5 parts of crystalline polyacetaldehyde.

What is claimed is:
1. In a process for the production of polymers of aldehydes comprising polymerizing at least one aldehyde in the presence of a catalyst and subsequently separating the polymer formed, the improvement wherein crystalline polyether type polymers are produced by

(1) premixing (a) a member selected from the group consisting of a monoaldehyde having from 2 to 10 carbon atoms in the molecule and having the formula RCHO wherein R represents a member selected from the group consisting of alkyl, haloalkyl, furfural and 2-formyl-3,4-dihydro-2H-pyran (b) a catalyst selected from the group consisting of $MR_2'$ and $MR'X$ wherein R' represents a member selected from the group consisting of alkyl and alkoxy wherein the alkyl moiety is of from 1 to 10 carbon atoms; M represents a member selected from the group consisting of magnesium, calcium and zinc; and X represents halogen, said premixing being conducted in an inert solvent medium and at a temperature between room temperature and −30° C., (2) lowering the temperature to a range of from −30° C. to −120° C. to thereby initiate polymerization, and (3) maintaining the temperature at from −30° C. to −120° C. until the polymerization is complete.

2. A process as claimed in claim 1 wherein the amount of the catalyst compound present is from about 0.01 mole to about 3.0 moles per mole of the aldehyde monomer.

3. A method as in claim 1 wherein the solvent medium is a member selected from the group consisting of alkanes, cycloalkanes, alkenes, aromatic hydrocarbons, ethers, halogenated hydrocarbons, halogenated ethers, esters and nitriles, said member being liquid at the polymerization temperature.

References Cited by the Examiner

UNITED STATES PATENTS

| 2,084,213 | 6/1937 | Osterhof | 260—67 |
| 2,274,749 | 3/1942 | Smyers | 260—67 |
| 2,848,437 | 8/1958 | Langsdorf | 260—67 |
| 3,001,966 | 9/1961 | Funck et al. | 260—67 |
| 3,037,950 | 6/1962 | Temin | 260—67 |
| 3,183,210 | 5/1965 | Furukawa et al. | 260—67 |

FOREIGN PATENTS 876,956    9/1961    Great Britain.

OTHER REFERENCES

Furukawa et al., Die Makromoleculare Chemie, vol. 37, (April 1960), pp. 149–152.

Natta et al., ibid, pp. 156–159.

Furukawa et al., ibid, vol. 44, March 1961, pp. 398–407.

(Other references on following page)

OTHER REFERENCES

Derivent, Belgian Patents Report, No. 75A (May 1961), pp. A7–8, For. Pat. Jor.

Villani et al., Journ. American Chem. Soc., vol. 69 (August–December 1947), pages 2605–07.

Bevington, Quaterly Review (London), vol. 6, No. 2 (1952), pages 141–156.

Chem. Abstracts, vol. 46, p. 1520.

SAMUEL H. BLECH, *Primary Examiner.*

MILTON STERMAN, LOUISE P. QUAST, WILLIAM H. SHORT, *Examiners.*

R. J. BUTTERMARK, L. M. MILLER,
*Assistant Examiners.*